Apr. 17, 1923.  1,451,738
W. L. LEISGE
METER FOR MILKING APPARATUS
Filed Jan. 24, 1921   2 sheets-sheet 1

Inventor
W. L. Leisge,

Apr. 17, 1923.
W. L. LEISGE
1,451,738
METER FOR MILKING APPARATUS
Filed Jan. 24, 1921     2 sheets-sheet 2
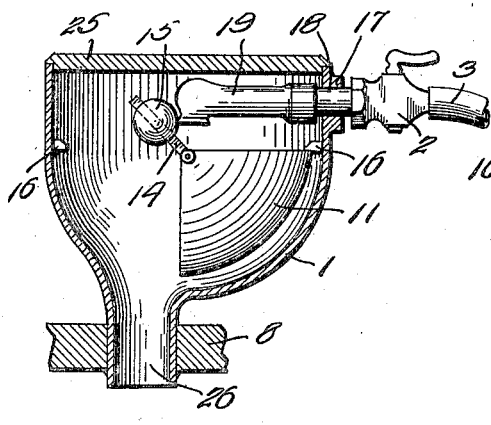
Fig. 4.
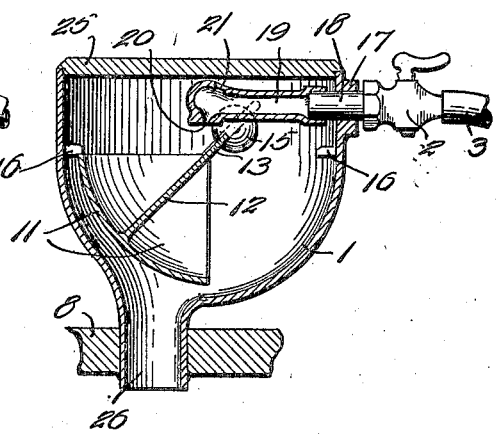
Fig. 5.
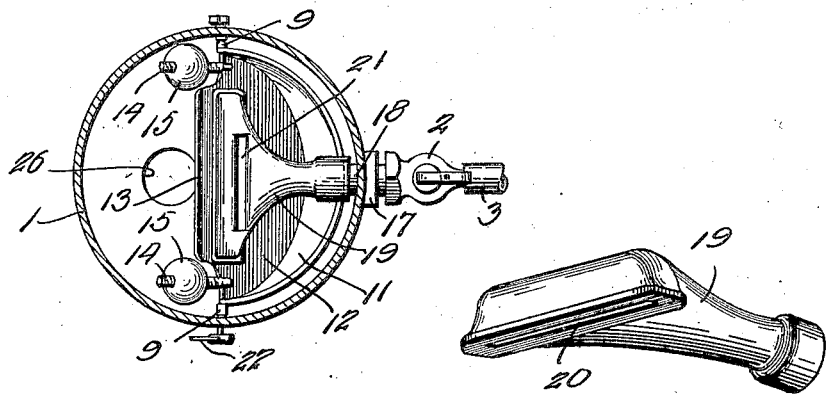
Fig. 6.
Fig. 7.
Inventor
W. L. Leisge
Witness Patented Apr. 17, 1923.

1,451,738

UNITED STATES PATENT OFFICE.

WILLIAM L. LEISGE, OF ATKINSON, NEBRASKA.

METER FOR MILKING APPARATUS.

Application filed January 24, 1921. Serial No. 439,404.

*To all whom it may concern:*

Be it known that I, WILLIAM L. LEISGE, a citizen of the United States, residing at Atkinson, in the county of Holt and State of Nebraska, have invented a new and useful Meter for Milking Apparatus, of which the following is a specification.

The object of my invention is to provide a novel meter for use in connection with milking apparatus of the double unit milker type, which will make it possible to weigh the milk of each cow and enable the dairyman to keep an accurate record for obvious reasons. I attain the object of my invention by the mechanism illustrated in the accompanying drawings, in which—

Fig. 4 is a longitudinal section partly in elevation through the meter showing the double cup in one of its extreme positions;

Fig. 5 is a longitudinal section through the meter, double cup and discharged nozzle, with a double cup shown in its other extreme position;

Fig. 6 is a section on line 6—6 of Fig. 2; and

Fig. 7 is a detailed perspective view of member 19.

Like numerals designate like parts of each of the views.

Figure 1:
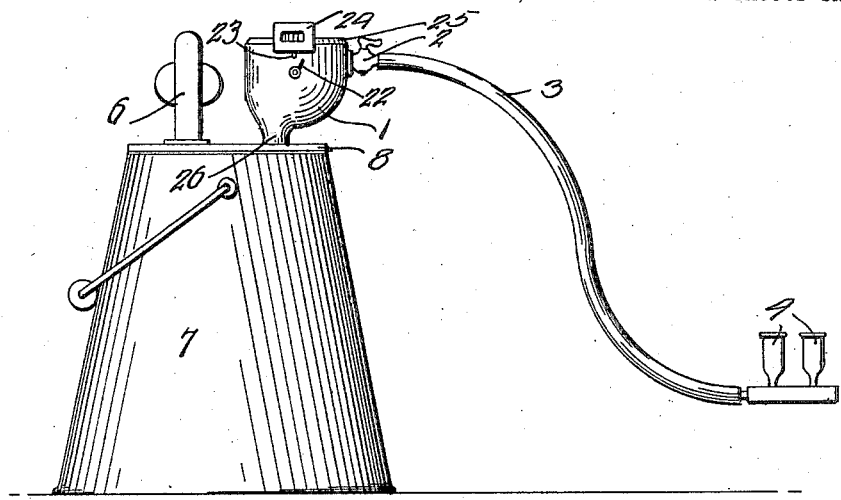
Figure 1 is a side elevation of the meter applied to the milking apparatus.

Referring to the accompanying drawings, a conventional milking apparatus is shown consisting of a milk pail 7 having a cover 8 on which is mounted the conventional pulsator 6 of a vacuum milking apparatus. The teat cups 4 are connected by the conventional milk tube 3 and valve 2 with the casing 1 of the milk meter. Mounted in the upper portion of the meter casing 1 are trunnions 9 adjustably mounted in bearings 10 and pivotally supporting the double cup partition 12 which carries the double cups 11. Mounted on partition 12 are screw threaded rods 14 which carry adjustable weights 15 adjustably mounted on rods 14. Partition 12 is provided with an extension or lip 13 adapted to guide the milk into whichever of the cups 11 is in position to receive same. Valve tube which is attached to the milk tube 3 terminates in a short tube 18, mounted in bearing 17 of the casing 1, and which tube 18 carries the nozzle 19 which is provided with a discharge opening 20 in the form of an elongated slot or mouth, above which is positioned a suitable slot 21 to admit air to the nozzle so that the milk will flow freely down through the mouth 20 into one of the double cups 11, and subsequently through the discharge nozzle 26 of casing 1 into the milk pail 7. I provide opposite stops 16 on the inside of the casing disposed to limit the swinging movement of the cups 11 and to retain same in the desired position while being filled, as shown in Figs. 4 and 5. Casing 1 is provided with a suitable cover 25. I provide a suitable trip finger 22 rigidly attached to or connected with the partition 12 of the double cups and moving in unison therewith. Said trip finger is positioned to operatively engage the operated element 23 of a comptometer 24, so that each swing of the finger 22 will register on the comptometer 24.

Figures 2, 3:
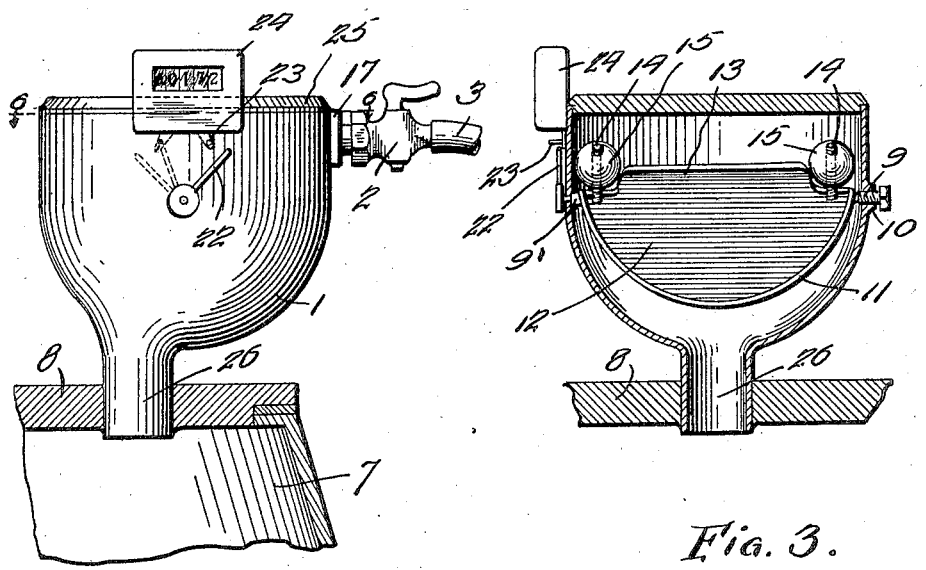
Fig. 2 is an enlarged side elevation of the meter.
Fig. 3 is a cross section through the meter.

In operation the milk flowing in through tube 3 and nozzle 19 whence it is discharged through mouth 20 into one of the double cups 11, the milk being guided by partition 12 and extension 13 into whichever cup is in uppermost position. The cups are of a suitable size and the weights 15 suitably adjusted so that the cups will hold a predetermined quantity of milk (preferably one tenth of one pound), and when that weight has been received the weight of the milk in the uppermost cup will over balance the weight 14 and cause the twin cups 11 to swing to a reverse position, thereby dumping the milk from the cup into the casing 1 and through its discharge nozzle 26 into the milk pail 7. The milk flowing into the meter then flows into the other of the two twin cups, which is now in uppermost position and the operation is continued, the trip finger 22 operating the comptometer actuated member 23 to register each discharge of one of the twin cups 11, thus registering the weight of the milk passing through the meter. One of the trunnions 9 is adjustable or removable to permit of removal of the twin cups for cleaning the device. The other trunnion 9' operatively connects the twin cup partition 12 with oscillating trip finger 22, as will be understood by reference to Figs. 3 and 6. Trunnion 9 includes a thumb nut on its outer end as shown.

The meter makes possible the weighing of the milk of each cow with a milking apparatus of the double unit milker type, and it also shows when the cow refuses to give milk, and it simplifies the making of records of the weight of milk obtained. The lid 25 of the meter casing can easily be removed as it is held in place merely by the vacuum produced by the milking apparatus, and is released when the vacuum is shut off.

It is within the contemplation of my invention to make minor modifications in the mechanism for operating the meter without departing essentially from the apparatus described and shown.

What I claim is:

1. In combination with the milking apparatus of the class described, a meter comprising a casing having a cover normally held to its seat by the vacuum produced by the milking apparatus, twin cups pivotally supported within the casing, adjustable means for overbalancing the weight of the cups and the contents of the uppermost cup up to a predetermined weight, means for limiting the upward oscillating movement of the cups when the weight of the milk in the uppermost cup causes it to discharge the milk and reverse its position, and means for discharging the milk into whichever of the twin cups is uppermost, said means being connected with the valve tube of the milking apparatus.

2. In combination with the milking apparatus of the class described, the combination of a meter casing having a removable cover, double cups, the partition member of said cups having an extension for guiding the milk into the uppermost cup, adjustable weights mounted on said partition, a trip finger operatively connected with the partition and operated in unison therewith, a comptometer actuated by the oscillation of said trip finger, and means for the free discharge of milk into the uppermost twin cup from the milking apparatus.

WILLIAM L. LEISGE.